(12) United States Patent
Danby et al.

(10) Patent No.: US 12,378,707 B2
(45) Date of Patent: Aug. 5, 2025

(54) MULTI-LAYER KNITTED COMPONENT

(71) Applicant: NIKE, Inc., Beaverton, OR (US)

(72) Inventors: Nicola A. Danby, London (GB); Lauren E. Durrell, Beaverton, OR (US); Alexandra K. Ulmer, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 350 days.

(21) Appl. No.: 16/839,459

(22) Filed: Apr. 3, 2020

(65) Prior Publication Data

US 2020/0354866 A1 Nov. 12, 2020

Related U.S. Application Data

(60) Provisional application No. 62/843,882, filed on May 6, 2019.

(51) Int. Cl.
*D04B 1/16* (2006.01)
*A43B 23/02* (2006.01)
(Continued)

(52) U.S. Cl.
CPC ............ *D04B 1/16* (2013.01); *A43B 23/0215* (2013.01); *A43B 23/025* (2013.01); *B32B 5/026* (2013.01);
(Continued)

(58) Field of Classification Search
CPC ........ D04B 1/16; D04B 1/24; D10B 2331/02; D10B 2401/041; D10B 2501/043;
(Continued)

(56) References Cited

U.S. PATENT DOCUMENTS 5,589,245 A * 12/1996 Roell ..................... D03D 27/10
428/920
5,783,277 A * 7/1998 Rock ........................ B32B 5/26
428/95
(Continued)

FOREIGN PATENT DOCUMENTS

CN 106037194 A 10/2016
CN 207341288 U 5/2018
(Continued)

OTHER PUBLICATIONS

International Preliminary Report on Patentability received for PCT Patent Application No. PCT/US2020/030927, mailed on Nov. 18, 2021, 18 pages.
(Continued)

*Primary Examiner* — Danny Worrell
*Assistant Examiner* — Dakota Marin
(74) *Attorney, Agent, or Firm* — SHOOK, HARDY & BACON L.L.P.

(57) ABSTRACT

A knitted component comprising a spacer knit construction having a first knitted layer and a second knitted layer facing opposite the first knitted layer, the second knitted layer spaced relative to the first knitted layer and defining a cavity therebetween, and a spacer strand traversing the cavity between the first knitted layer and the second knitted layer to secure the first knitted layer to the second knitted layer. The first knitted layer is at least partially formed with a first monofilament and a second monofilament such that both of the first monofilament and the second monofilament are exposed on an outer surface of the first knitted layer. The first monofilament comprises a first denier and the second monofilament comprises a second denier, the first denier being at least 250% greater than the second denier.

20 Claims, 7 Drawing Sheets

(51) Int. Cl.
  *B32B 5/02* (2006.01)
  *B32B 5/26* (2006.01)
  *D04B 1/24* (2006.01)
  *D01F 8/12* (2006.01)
  *D01F 8/16* (2006.01)

(52) U.S. Cl.
  CPC .............. *B32B 5/26* (2013.01); *D04B 1/24* (2013.01); *B32B 2262/0261* (2013.01); *B32B 2262/12* (2013.01); *B32B 2437/02* (2013.01); *D01F 8/12* (2013.01); *D01F 8/16* (2013.01); *D10B 2331/02* (2013.01); *D10B 2401/041* (2013.01); *D10B 2403/021* (2013.01); *D10B 2501/043* (2013.01)

(58) Field of Classification Search
  CPC ....... D10B 2403/021; D01F 8/12; D01F 8/16; B32B 5/026; B32B 5/02; B32B 2262/0261; B32B 2262/12; B32B 2437/02; A43B 23/0215; A43B 23/02
  USPC ......................................................... 442/308
  See application file for complete search history.

(56) References Cited

U.S. PATENT DOCUMENTS

| | | | | |
|---|---|---|---|---|
| 6,156,406 | A * | 12/2000 | Rock | B32B 5/06 428/86 |
| 6,477,865 | B1 * | 11/2002 | Matsumoto | D04B 21/10 66/196 |
| 6,755,052 | B1 * | 6/2004 | Sytz | D04B 1/18 66/196 |
| 6,779,369 | B2 * | 8/2004 | Shepherd | D04B 1/126 66/196 |
| 8,522,577 | B2 * | 9/2013 | Huffa | D04B 15/70 66/127 |
| 8,959,959 | B1 * | 2/2015 | Podhajny | A43B 23/0235 36/47 |
| 9,060,570 | B2 * | 6/2015 | Huffa | D04B 15/56 |
| 11,299,829 | B2 * | 4/2022 | Meir | D04B 15/362 |
| 11,346,025 | B2 * | 5/2022 | McFarland, II | D04B 1/16 |
| 2009/0123713 | A1 * | 5/2009 | Conley | B32B 7/12 428/196 |
| 2017/0029989 | A1 * | 2/2017 | Tuscia | B32B 27/322 |
| 2017/0245582 | A1 * | 8/2017 | Green | D04B 1/24 |
| 2020/0046074 | A1 | 2/2020 | Berrian et al. | |
| 2020/0121019 | A1 | 4/2020 | Bartys et al. | |

FOREIGN PATENT DOCUMENTS

| | | |
|---|---|---|
| CN | 108779591 A | 11/2018 |
| EP | 0692563 A1 | 1/1996 |
| TW | 201609009 A | 3/2016 |
| WO | 2004/079064 A2 | 9/2004 |
| WO | 2011/108954 A1 | 9/2011 |
| WO | WO 2015/116293 A1 | 8/2015 |
| WO | WO 2019/079554 A1 | 4/2019 |

OTHER PUBLICATIONS

Invitation to Pay Additional Fees and, Where Applicable, Protest Fee including Communication Relating to the Results of the Partial International Search and Provisional Opinion Accompanying the Partial Search Result for International Patent Application No. PCT/US2020/030927 dated Nov. 26, 2020; 23 pages.

International Search Report and Written Opinion for International Patent Application No. PCT/US2020/030927 dated Feb. 1, 2021; 26 pages.

Intention to Grant received for European Patent Application No. 20727768.2, mailed on Apr. 28, 2023, 7 pages.

Intention to Grant received for European Patent Application No. 20727768.2, mailed on Oct. 5, 2023, 7 pages.

Extended European Search Report received for European Application No. 23212504.7, mailed on Jul. 4, 2024, 18 pages.

Partial European Search Report received for European Patent Application No. 23212504.7, mailed on Mar. 7, 2024, 17 pages.

* cited by examiner

MULTI-LAYER KNITTED COMPONENT

RELATED APPLICATION

This application claims the benefit of U.S. Provisional Application No. 62/843,882, filed on May 6, 2019, the entirety of which is incorporated herein by reference.

BACKGROUND

A variety of articles are formed from textiles. As examples, articles of apparel (e.g., shirts, pants, socks, footwear, jackets and other outerwear, briefs and other undergarments, hats and other headwear), containers (e.g., backpacks, bags), and upholstery for furniture (e.g., chairs, couches, car seats) are often at least partially formed from textiles. These textiles are often formed by weaving or interlooping (e.g., knitting) a yarn or a plurality of yarns, usually through a mechanical process involving looms or knitting machines. One particular object that may be formed from a textile is an upper for an article of footwear.

Conventional articles of footwear generally include two primary elements: an upper and a sole structure. The upper is secured to the sole structure and forms a void within the article of footwear for comfortably and securely receiving a foot. The sole structure is secured to a lower surface of the upper so as to be positioned between the upper and the ground. In some articles of athletic footwear, for example, the sole structure may include a midsole and an outsole. The midsole may be formed from a polymer foam material that attenuates ground reaction forces to lessen stresses upon the foot and leg during walking, running, and other ambulatory activities. The outsole may be secured to a lower surface of the midsole and forms a ground-engaging portion of the sole structure that is formed from a durable and wear-resistant material.

The upper of the article of footwear generally extends over the instep and toe areas of the foot, along the medial and lateral sides of the foot, and around the heel area of the foot. The upper may also extend at least partially underneath the foot of a wearer. Access to the void on the interior of the upper is generally provided by an ankle opening in a heel area of the footwear. A lacing system is often incorporated into the upper to adjust the fit of the upper, thereby facilitating entry and removal of the foot from the void within the upper. The upper may include a tongue that extends under the lacing system to enhance adjustability of the footwear, and the upper may incorporate one or more additional components, such as a heel counter to limit movement of the heel.

Knitting is an example of a process that may form a textile, including an upper for an article of footwear. Knitting may generally be classified as either weft knitting or warp knitting. In both weft knitting and warp knitting, one or more yarns are manipulated to form a plurality of intermeshed loops that define a variety of courses and wales. In weft knitting, which is more common, the courses and wales are perpendicular to each other and may be formed from a single yarn or many yarns. In warp knitting, the wales and courses run roughly parallel.

Although knitting may be performed by hand, the commercial manufacture of knitted components is generally performed by knitting machines. An example of a knitting machine for producing a weft knitted component is a V-bed flat knitting machine, which includes two needle beds that are angled with respect to each other. Rails extend above and parallel to the needle beds and provide attachment points for feeders, which move along the needle beds and supply yarns and/or monofilaments to needles within the needle beds. Standard feeders have the ability to supply one or more yarns or monofilaments that are utilized to knit, tuck, and float. In situations where an inlay yarn is incorporated into a knitted component, an inlay feeder may be utilized.

One application of a V-bed flat knitting machine is the manufacture of so-called "spacer knit" or "spacer mesh" constructions consisting of two separate layers, with one or more yarns or monofilaments extending therebetween and interlocking (e.g., via knitting or tucking) with the two layers. Some advantages of spacer knit constructions include loft, cushioning, breathability, energy absorption, compression strength, insulation, pressure distribution, good dispersion of moisture, etc., some or all of which may be desirable in various articles formed from textiles, including for example, an upper for an article of footwear. Depending on the materials selected to form the separate layers, and the yarns or monofilaments extending therebetween, these and other characteristics may be realized or enhanced. In the context of footwear, certain additional characteristics may be desirable, including for example, abrasion resistance, weight, user comfort, and aesthetics

DESCRIPTION OF THE DRAWINGS

The embodiments will be further described in connection with the attached drawings. It is intended that the drawings included as a part of this specification be illustrative of the exemplary embodiments and should in no way be considered as a limitation on the scope of the present disclosure. Indeed, the present disclosure specifically contemplates other embodiments not illustrated but intended to be included in the claims.

DETAILED DESCRIPTION

Figure 1:
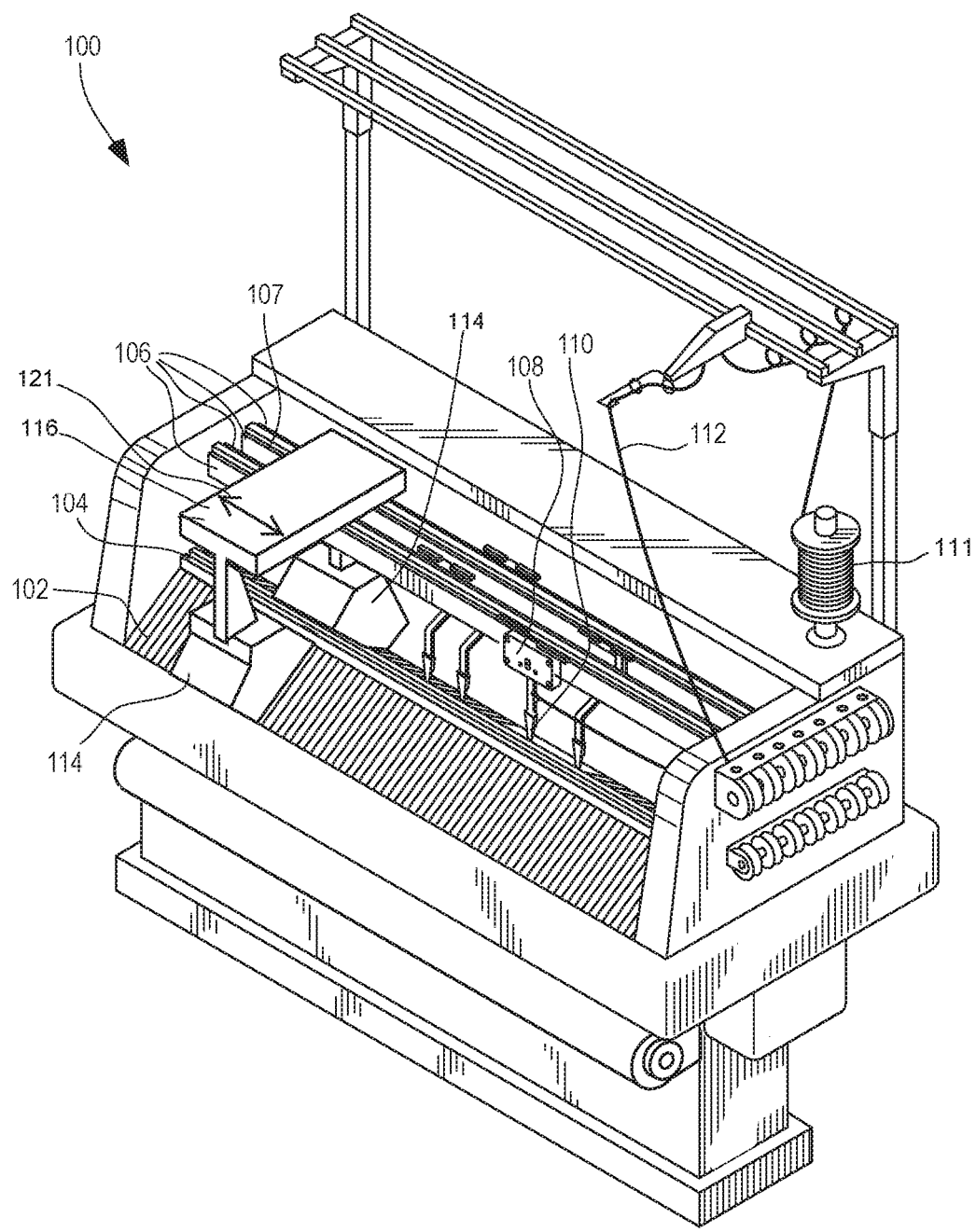
FIG. 1 is an illustration showing a perspective view of an exemplary knitting machine suitable for constructing a knitted component according to the present disclosure.

Various aspects are described below with reference to the drawings in which like elements generally are identified by like numerals. The relationship and functioning of the various elements of the aspects may better be understood by reference to the following detailed description. However, aspects are not limited to those illustrated in the drawings or explicitly described below. It also should be understood that the drawings are not necessarily to scale, and in certain instances details may have been omitted that are not necessary for an understanding of aspects disclosed herein, such as conventional fabrication and assembly.

Certain aspects of the present disclosure relate to articles at least partially formed from textiles. One example of an article is an article of apparel (e.g., shirts, pants, socks, footwear, jackets and other outerwear, briefs and other undergarments, hats and other headwear, or the like). The article may be an upper configured for use in an article of footwear. The upper may be used in connection with any type of footwear. Illustrative, non-limiting examples of articles of footwear include a basketball shoe, a biking shoe, a cross-training shoe, a global football (soccer) shoe, an American football shoe, a bowling shoe, a golf shoe, a hiking shoe, a ski or snowboarding boot, a tennis shoe, a running shoe, and a walking shoe. The upper may also be incorporated into a non-athletic shoe, such as a dress shoe, a loafer, and a sandal.

One aspect of the present disclosure is a knitted component having a balance of advantageous properties, including, for example, abrasion resistance, weight, user comfort, and aesthetics suitable for use in an upper for an article of footwear. In some aspects of the present disclosure, a knitted component may be formed having a single layer, a double layer, or more layers. When formed having a double layer, the knitted component may have a first knitted layer and a second knitted layer. A space or pocket may be formed between the respective first and second knitted layers. The space may remain empty, such as in the form of a void or pocket. Alternatively, the space formed between the layers may include one or more spacer strands, inlaid yarns or strands, padding, such as foam, air or other materials, or other structures that may enhance cushioning, loft, durability, fit or provide other advantageous properties.

In one non-limiting example, at least one layer may comprise at least one monofilament, or more. When more than one monofilament is used, a first monofilament may be the same type as a second monofilament, or it may be different. For example, a first monofilament may have certain properties, including but not limited to denier, diameter, melting point, tenacity, elongation and other features, whereas the second monofilament may differ in one or more of these properties. Further, the at least one layer may be formed by using one or more ends (i.e., strands) of the first and/or second monofilaments, or combinations thereof.

The second layer of the knitted component may also comprise one or more of the monofilaments used to form the first layer. Alternatively, the second layer may use one or more yarns that are different from the yarns or strands used to form the first layer. In one example, the second layer may be formed from a third yarn that has at least one property that differs from the first and second monofilaments. More specifically, the third yarn may comprise a multifilament twisted yarn, which may be at least partially formed from a thermoplastic material having a particular melting point, a thermoset material having a decomposition temperature, or combinations thereof. As described below, the second layer may include at least one polyester yarn and at least one monofilament. The at least one monofilament present in the second layer may be the same as at least one of the first and second monofilaments of the first layer, or it may be different. As illustrated in FIG. 6F, the second layer may include at least one polyester yarn in combination with the first monofilament.

As mentioned above, a void or pocket may be formed between at least a portion of the first and second knitted layers. The void may include one or more yarns or strands extending therebetween. This may include a multifilament twisted yarn and/or a monofilament that is positioned between the first and second knitted layers. In one example, one or more spacer strands may extend between the first and second knitted layers in a zig-zag fashion. This may be accomplished by knitting or tucking a multifilament yarn or monofilament at various points on the first and second needle beds of a knitting machine, between the first and second layers, such that the spacer strand (e.g. a multifilament yarn or monofilament) extends alternately between the layers as mentioned above. A multi-layer knitted component, with one or more yarns or strands extending between the respective layers, may form what is referred to herein as a "spacer knit."

In one exemplary embodiment, a third yarn or strand may extend between at least a portion of the first and second knitted layers. The third yarn may comprise a multifilament yarn or a monofilament that is selected based upon one or more desired advantageous properties that it provides. For example, the third yarn may have a particular denier, thickness, melting point, strength or other properties. The third yarn may be the same as, or different from the yarns or strands used to form other portions of the knitted component. As illustrated in exemplary FIG. 6C, the third yarn extending between the first and second knitted layers may include a multifilament yarn having a relatively high tenacity as described in further detail below. One or more additional yarns may be used in lieu of, or in combination with the third yarn, extending between at least a portion of the first and second knitted layers.

For example, as described in greater detail herein, and in particular with reference to FIG. 6F, in one embodiment, a first or outer surface of the knitted component includes one or more ends of a first monofilament, and one or more ends of a second monofilament. The first monofilament comprises a nylon core surrounded by a sheath of thermoplastic material, has a diameter of 0.13 mm, and a linear mass density of 150 denier. The second monofilament is comprised of nylon, has a diameter of 0.08 mm, and a linear mass density of approximately 61 denier. One or both of the first monofilament and/or the second monofilament may be at least semi-transparent to enable and/or enhance visualization of elements within the knitted component, thereby creating a unique aesthetic appearance.

A second or inner surface of the knitted component includes one or more ends of the first monofilament, and one or more ends of a third yarn, the third yarn being different than the first monofilament and the second monofilament. The third yarn may comprise polyester, has a linear mass density of 150 denier, and include 100 filaments per strand.

The first or outer layer of the knitted component and the second or inner layer of the knitted component may be interlocked by a high-tenacity yarn. The high tenacity yarn may comprise polyester, have a linear mass density of 300 denier, include 48 filaments per strand, and have a tenacity of 6.5 grams per denier.

The co-extruded monofilament and fine-denier monofilament described herein are uniquely suited for construction of a knitted component for use in an upper for an article of footwear for various reasons. As explained herein, the nylon core provides a strengthening component for the spacer knit construction, while the TPU sheath provides for abrasion resistance, moldability during any post-knitting heat processing, and transparency. On the other hand, the fine-denier monofilament lends strength to the spacer knit construction, while at the same time, is very light weight. Moreover, its very fine diameter and small linear mass density, enables and improves the transparency into and through the knitted component, particularly when the nylon monofilament is clear or transparent.

Knitting Machines

Figure 2:
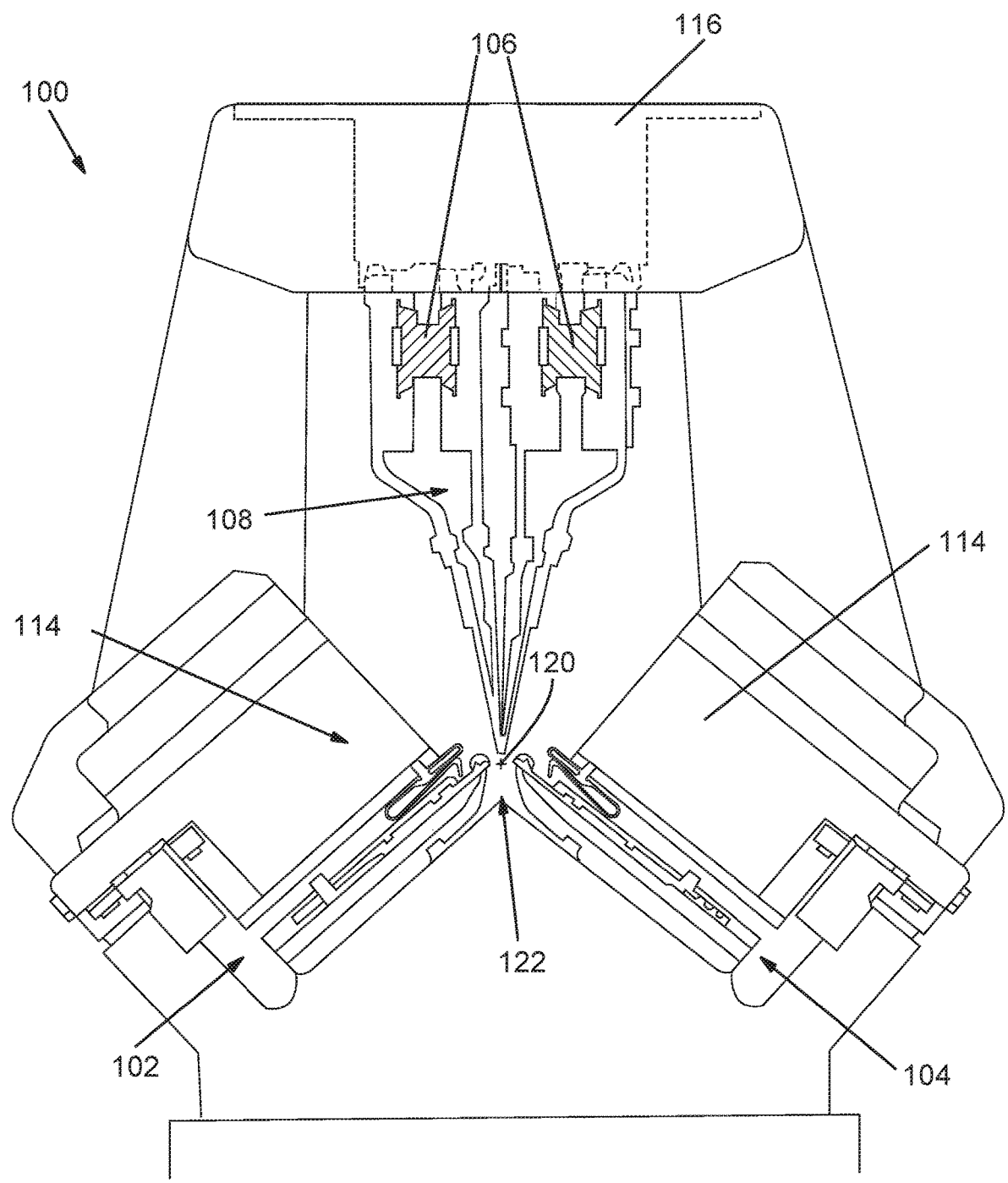
FIG. 2 is a schematic section view of the knitting machine of FIG. 1.

Referring initially to FIGS. 1-2, a knitting machine 100 is illustrated. Knitting machine 100 can be of any suitable type, such as a flat knitting machine, a circular knitting machine, or other type. For example, knitting machine 100 of FIG. 1 has a configuration of a V-bed flat knitting machine as an exemplary embodiment. However, the knitting machine 100 can have different configurations without departing from the scope of the present disclosure.

FIGS. 1-2 show a knitting machine 100 with two needle beds (a front or first needle bed 102 and a back or second needle bed 104) that are angled with respect to each other (e.g., thereby forming a V-bed). The needles 101 of the first needle bed 102 may lay on a first plane, and the needles 101 of the second needle bed 104 may lay on a second plane. The first plane and the second plane may be angled relative to each other and meet to form an intersection 120 (or axis) that extends along a majority of a width of the knitting machine 100. The first needle bed 102 and the second needle bed 104 may be spaced apart relative to each other to define a gap 122, as shown in FIGS. 1-2. The needles, needle beds, and intersection are further described below, and in additional detail in U.S. patent application Ser. No. 13/048,540, patented as U.S. Pat. No. 9,060,570, which is herein incorporated by reference in its entirety.

One or more rails 106 may extend above and parallel to the intersection and may provide attachment points for one or more feeders 108. Herein, the rails 106 are defined by a track for which a feeder 108 may couple to in a movable manner. The rails 106 may be secured to a body 107, where the body 107 includes a rail 106 on each side (e.g., on two sides as shown) (and where each of the rails 106 are configured to couple to one or more feeders 108). Two rails 106 are included in the depicted embodiment, but more or fewer than two rails 106 may be included. The feeders 108 may include a dispensing area 110 located near the intersection 120 and configured to dispense a yarn or monofilament 112 to at least one of the first needle bed 102 and the second needle bed 104 as it moves along the intersection 120. It will be appreciated that feeders 108 can be configured to feed any type of yarn, fiber, wire, cable, filament, or other strand toward the needles. Moreover, it will be appreciated that individual feeders 108 can be configured to simultaneously feed more than one strand of a material at a time. As used in this application, a yarn may include a strand (e.g., a monofilament strand) and is not intended to limit the present disclosure to multifilament materials.

The knitting machine 100 may include a carriage 114 that is movable along the first needle bed 102 and the second needle bed 104 in a longitudinal direction 121 of knitting machine 100. An upper portion 116 of the carriage 114 may include a set of plungers (not shown in FIG. 1) that can selectively engage at least one of the feeders 108 such that the feeder 108 that is engaged moves along one of the rails 108 as the carriage 114 moves. As the carriage 114 moves along the first needle bed 102 and the second needle bed 104, the carriage 114 may selectively actuate needles of the first needle bed 102 and/or the second needle bed 104 such that the actuated needles move from the default position to the extended position. The actuation may be the result of a set of cams (not shown in FIG. 1) of the carriage 114 making contact with a butt portion of the needles and forcing the needles to move from the default position to the extended position as the carriage 114 passes. Due to the action of the carriage 114, the feeder 108, and the needles 101, the yarn or monofilament 112 may be dispensed from the feeder 108 and to the needles 101 of at least one of the first needle bed 102 and the second needle bed 104. The needles 101 and/or feeders 108 can therefore receive yarn or monofilament 112 and can perform various knitting procedures for incorporating yarn or monofilament 112 into a knitted component. For example, the components of the knitting machine 100 can knit, tuck, float, inlay, or otherwise manipulate yarn 112 to form a knitted component.

Solely for purposes of illustration, the knitting machine 100 of FIG. 1 includes a single spool 111 of yarn or monofilament 112 for delivery of a strand or end of yarn or monofilament 112 to the feeders 108. However, it will be appreciated that knitting machine 100 could have multiple spools of different yarn, fiber, wire, cable, filament, or other strand, and that any one or more strands or ends may be simultaneously delivered to any one feeder 108, or multiple feeders 108.

Figure 3:
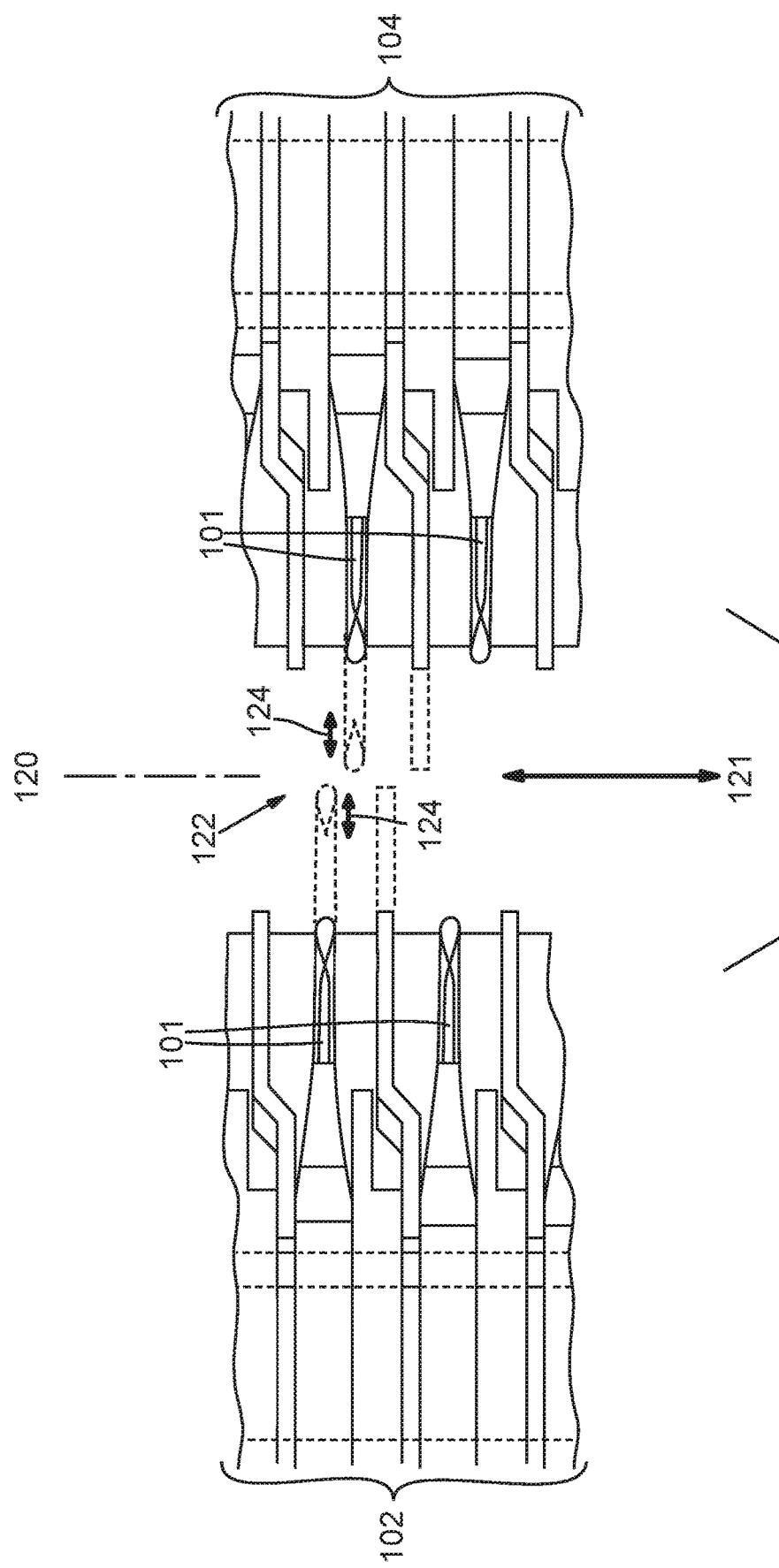
FIG. 3 is a top view of a needle bed of the knitting machine of FIG. 1.
Figure 4:
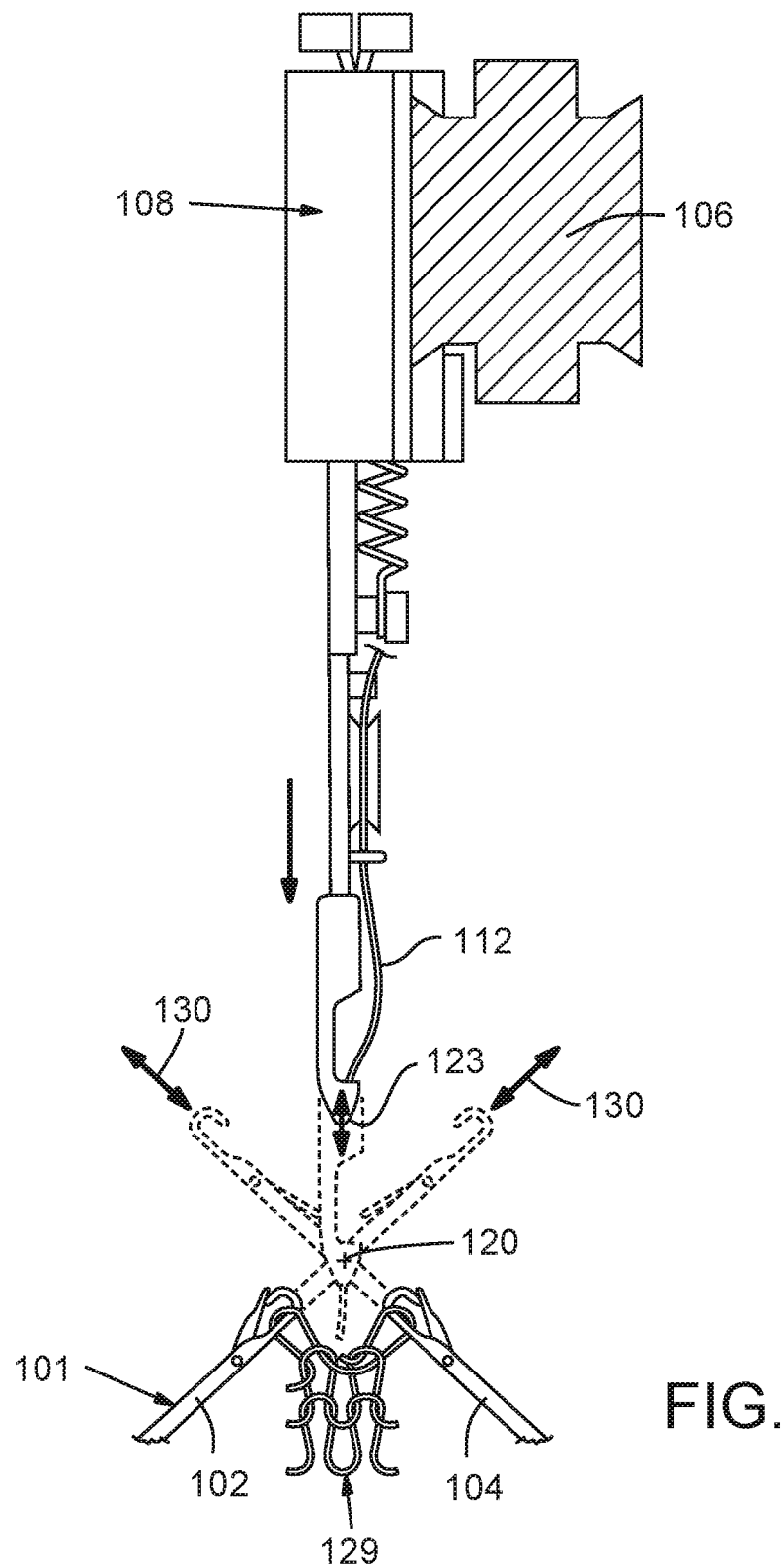
FIG. 4 is an end view of needles and a yarn feeder of the knitting machine illustrating a knitting process according to exemplary embodiments of the present disclosure.
Figure 5:
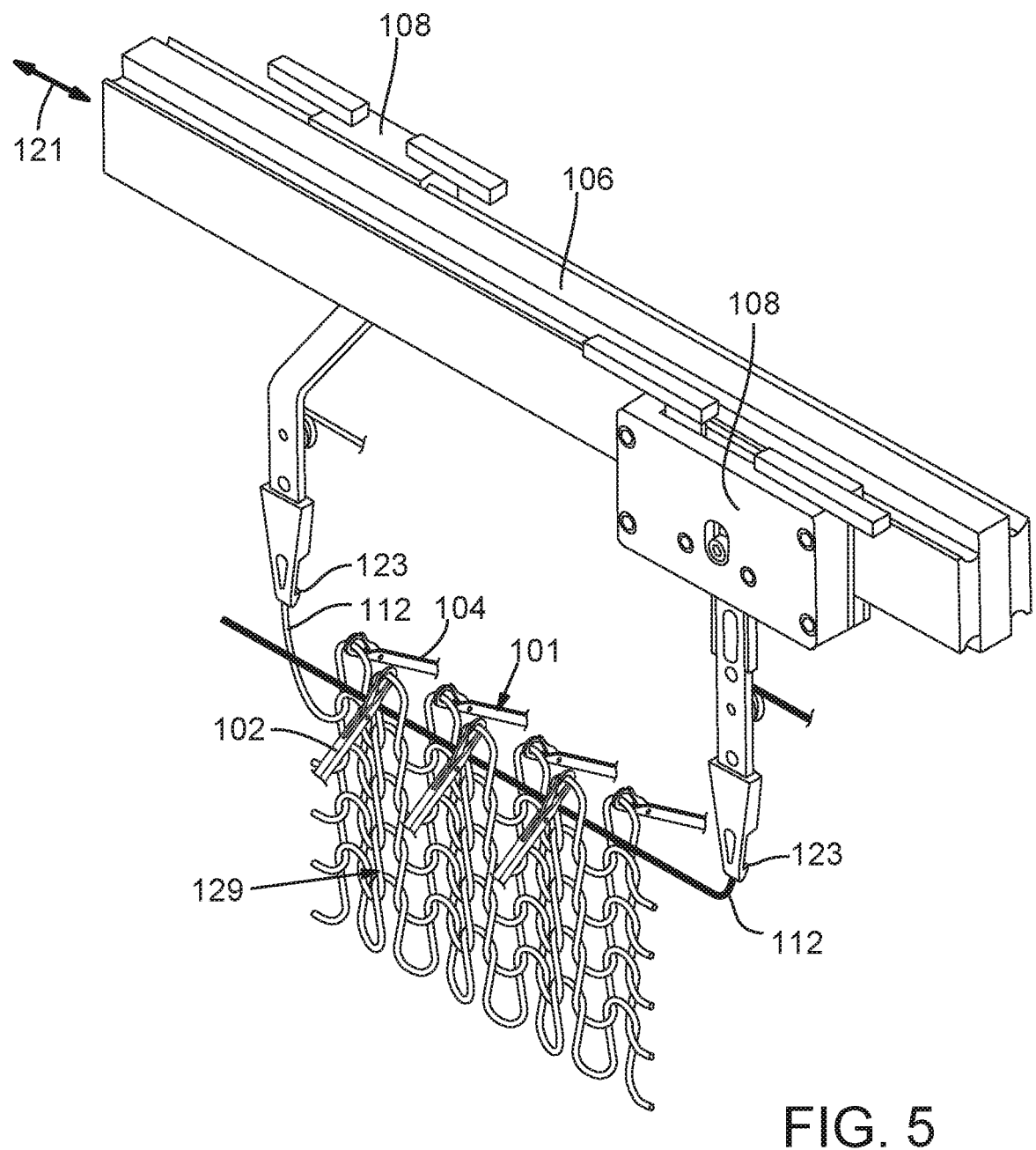
FIG. 5 is a perspective view of portions of the knitting machine of FIG. 1.

An exemplary arrangement of the first needle bed 102, the second needle bed 104, and a feeder 108 of the knitting machine 100 is further illustrated in FIGS. 3-5. As illustrated in FIG. 3, needles 101 can be configured to move relative to intersection 120 and relative to other needles 101 within the respective bed. For example, as shown in FIG. 3, needles 101 can be configured to move between a retracted position and an extended position. Needles 101 are shown in the retracted position with solid lines and in the extended position with broken lines in FIG. 3. In the retracted position, needles 101 can be spaced apart from intersection 120. In the extended position, needles 101 can be extended through intersection 120. This movement of needles 102 can be substantially linear as represented by arrows 124 in FIG. 3.

In some embodiments, in addition to moving along the longitudinal direction 121, feeder 108 can be configured to move relative to needles 101 between a retracted position and an extended position, and in order to accommodate any changes in the position of intersection 120 due to a change in the position(s) of the first needle bed 102 and/or the second needle bed 104. For example, in the embodiment of FIG. 4, feeder 108 is shown in the retracted position with solid lines, and feeder 108 is shown in the extended position with broken lines. In the retracted position, an end 123 of feeder 108 can be disposed above the intersection 120 in some embodiments. In the extended position, end 123 of feeder 108 can be disposed below the intersection 120. Also, while in the extended position, feeder 108 can feed yarn 112 toward needles 101 to be inlaid within a knitted component 129, as represented in FIG. 5. In contrast, when in the retracted position, feeder 108 can feed yarn 112 toward needles 101 to form loops, tucks, floats, or other features of knitted component 129. Additionally, feeder 108 and other features of knitting machine 100 can be configured according to the teachings of U.S. Pat. No. 8,522,577, which issued on Sep. 3, 2013, and which is incorporated by reference in its entirety.

It will be appreciated that, in other embodiments, or in specific applications, feeder 108 can have a single, fixed position relative to intersection 120. For example, in some embodiments and applications, feeder 108 can remain above the intersection 120 as feeder 108 moves in the longitudinal direction 121 of knitting machine 100. Also, in some embodiments and applications, feeder 108 can remain below the intersection 120 as feeder 108 moves in the longitudinal direction 121 of knitting machine 100.

One advantage of forming a knitted component having a spacer knit construction on a V-bed flat knitting machine, such as knitting machine 100, is that one of the layers of the spacer knit construction may be formed on one needle bed (e.g., the first needle bed 102), while the other layer is simultaneously formed on the other needle bed (e.g., the second needle bed 104). Furthermore, as the layers are being formed, the one or more yarns or monofilaments extending between the two layers may be knitted or tucked to interlock with the opposing layers. In this way, a knitted component including a spacer knit construction may be formed on a V-bed flat knitting machine as an integral, unitary, one-piece element from a single knitting process, thereby reducing or substantially eliminating significant post-knitting process or steps, and inefficiencies stemming from such post-knitting processes or steps.

Exemplary Spacer Knit Constructions

FIGS. 6A-F illustrate the formation of individual courses of a "spacer knit" or "spacer mesh" constructions using the knitting machine 100. It will be appreciated that the formation of the individual courses illustrated in FIGS. 6A-F may be repeated over multiple courses to form larger regions of a knitted component having a spacer knit construction. It will further be appreciated that the construction of individual courses of the spacer knit (including the materials forming the course) may change from one course to the next course to vary and/or blend the properties of individual courses having different spacer knit constructions. For example, the courses of the spacer knit may be "striped" such that one or more consecutive courses of a first construction are followed by one or more consecutive courses of a second construction different than the first construction, followed by the same one or more consecutive courses of the first construction, the same one or more consecutive courses of the second construction, and so on, to form a repeating pattern of courses. Alternatively, construction of individual consecutive courses of the spacer knit may vary in construction (including the materials forming the courses) in a non-uniform manner.

The illustrations of FIGS. 6A-F are only exemplary, and illustrate formation of a spacer knit on a weft knitting machine having a first needle bed 102 and a second needle bed 104, where one layer of the knitted component is formed on the first needle bed 102, while the other layer is formed on the second needle bed 104. The knitted structures formed by the processes illustrated in FIGS. 6A-F may differ in the types of machines on which they are formed, the number of needles used, whether needles are skipped (i.e., floated), the number of skipped needles, the specific knit structures (e.g., tucks vs. loops), the types and number of yarns or materials used, the inclusion of one or more inlaid strands, the size of certain sections/areas constituting the spacer knit construction, varying the construction of individual courses within the spacer knit (including the materials forming each individual course), inclusion of adjoining or adjacent sections of other constructions (e.g., a single or double jersey knit construction), etc. It will be further appreciated that the present disclosure could be applied to other forms of "spacer knit" or "spacer mesh" construction, including for example, those disclosed in U.S. Provisional Application No. 62/747,981, filed on Oct. 19, 2018, and 62/777,556, filed on Dec. 10, 2018, the entireties of which are herein incorporated by reference.

FIGS. 6A-F illustrate various forms of a knitted component, at least a portion of which comprises a spacer knit construction. In FIGS. 6A-F, the position of the needles 101 of the first needle bed 102 and the second needle bed 104 are spaced relative to one another by a distance d. In both FIGS. 6A and 6B, the knitting machine 100 has formed loops of a first yarn or monofilament 202 on the first needle bed 102, and loops of a second yarn or monofilament 204 on the second needle bed 104. The loops of the first yarn 202 may form a first surface or layer of the knitted component, while the loops of the second yarn 204 may form a second surface or layer of the knitted component, the first surface being separate from the second surface.

Figure 6A:
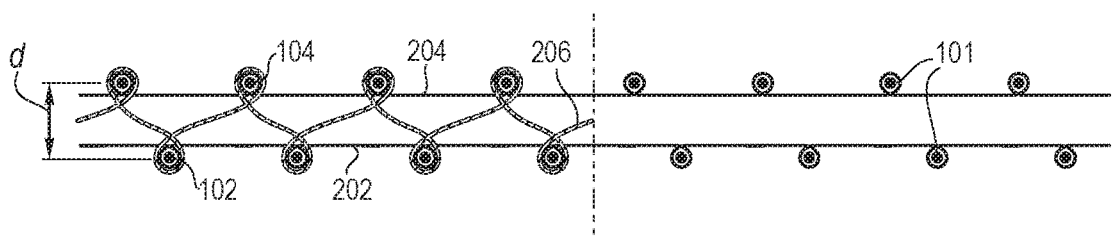
FIGS. 6A-F are illustrations showing the formation of various spacer knit constructions within the scope of the present disclosure; and, FIG. 7 is a cross-sectional view of a monofilament according to an embodiment of the present disclosure.
Figure 6B:
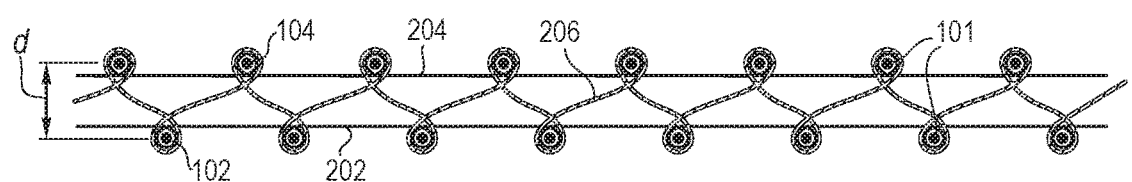
Figure 6C:
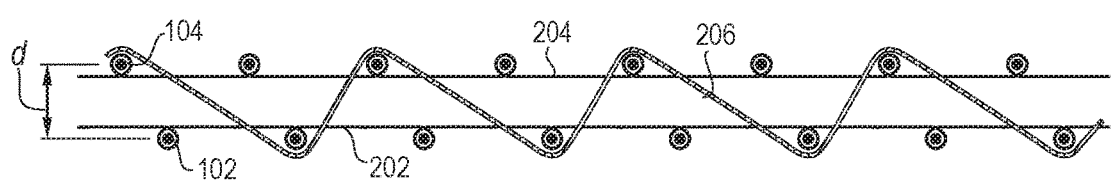

For purposes of explanation, in FIG. 6A, a partially illustrated spacer strand 206 extends between the course of the yarn 202 and the yarn 204, and is looped around one or more needles 101 of the first needle bed 102 and the second needle bed 104, to interlock with the surfaces or layers formed by the first yarn 202 and the second yarn 204. In FIG. 6B, the fully illustrated spacer strand 206 extends between the courses formed by the first yarn 202 and the second yarn 204. As shown in FIG. 6C, the spacer strand 206 could alternatively be tucked behind alternating needles 101 of the first needle bed 102 and the second needle bed 104. As previously noted, the spacer strand 206 may comprise a monofilament, or alternatively, the spacer strand 206 could comprise a yarn, fiber, wire, cable, multi-filament strand, or other strand.

Figure 6D:
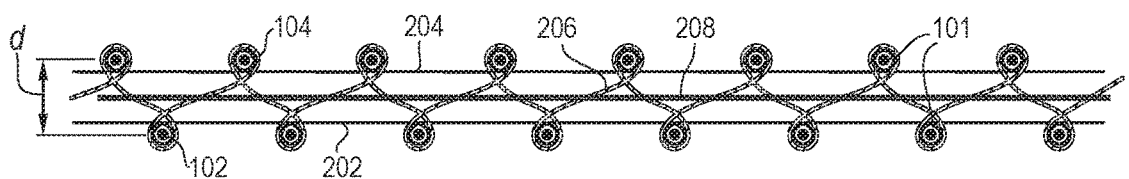

As illustrated in FIG. 6D, an inlaid strand 208 may be included in the knitted component. The inlaid strand may be deposited during the formation of one or more courses, either before or after the spacer strand 206 is interlocked with the first yarn 202 and with the second yarn 204. Although FIG. 6D illustrates only a single inlaid strand 208, it is also envisioned that two or more inlaid strands 208 may be included during the formation of the one or more courses of the knitted component, and that the two or more inlaid strands 208 may be positioned on the same or opposite sides of the spacer strand 206. The two or more inlaid strands 208 may comprise any number of suitable materials, and may be made of the same material(s), or alternatively, may comprise different materials, textures, and/or colors. In some embodiments, the inlaid strand(s) 208 could be metallic, reflective, or transparent.

Figure 6E:
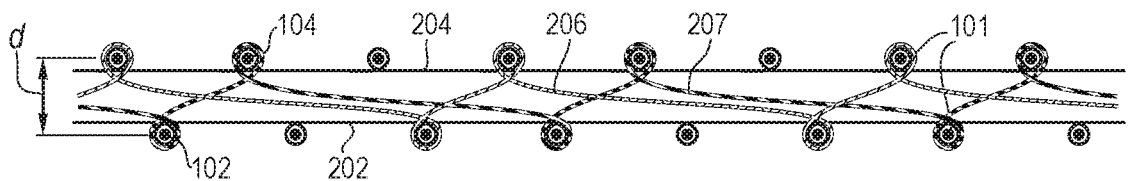
Figure 6F:
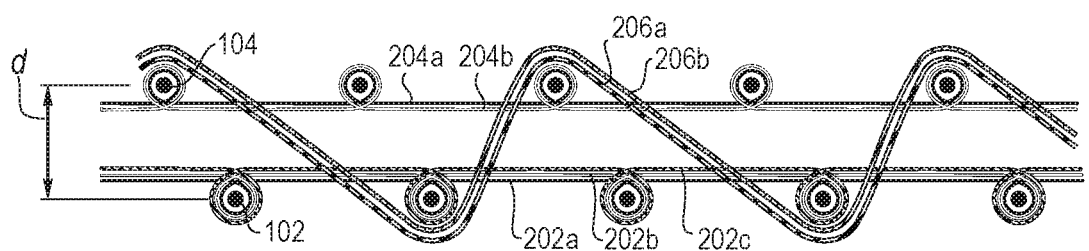

FIG. 6E is an illustration of another form of spacer knit construction, having at least two spacer strands 206, 207, and/or having spacer strand(s) that skip or "float" one or more needles 101 of the first needle bed 102 and the second needle bed 104. Any number of spacer strands 206, 207 may be used in the formation of a knitted component having a spacer knit construction, including for example, a first spacer strand 206, a second spacer strand 207, or more. The first spacer strand 206 and the second spacer strand 207 may comprise any number of suitable materials, and may be made of the same material(s), or alternatively, may comprise different materials, textures, and/or colors. In some embodiments, the spacer strand(s) 206, 207 could be metallic, reflective, or transparent.

Additionally, the first spacer strand 206, and if included, the second spacer strand 207, or more, may skip (e.g., float) one or more needles 101 during the interlocking process. Although the first spacer strand 206 and the second spacer strand 207 are illustrated in FIG. 6E as forming a loop on every third needle 101 of the first needle bed 102 and the second needle bed 104, the first spacer strand and the second spacer strand 207 could alternatively skip any number of needles 101.

FIG. 6F is another illustration of a form of spacer knit construction within the scope of the present disclosure, wherein three strands or ends of yarn or monofilament 202a, 202b, 202c are looped around the needles 101 of the first needle bed 102, and two strands or ends of yarn or monofilament 204a, 204b are looped around the needles 101 of the second needle bed 104. While FIG. 6F illustrates the formation of the first surface of the spacer knit using three strands or ends of yarn 202*a*, 202*b*, 202*c*, and the second surface of the spacer knit using two strands or ends of yarn 204*a*, 204*b*, it is envisioned that any number of strands or ends could be used, including 1, 2, 3, 4, or more. Forming the first surface of the spacer knit (and/or the second surface) using multiple different yarns and/or monofilaments has the effect of blending the material properties of the individual yarns and/or monofilaments, thereby potentially creating a knitted structure that is superior in desired performance to a knitted structure formed of its individual yarns or monofilaments. For example, the first surface (and/or the second surface) may be formed by one or more ends of different yarns or monofilaments to obtain a knitted structure that exhibits superior strength, heat molding, and/or color possibilities, all while maintaining transparency of the knitted component. When multiple strands or ends are used to form the first surface and/or the second surface of the knitted component, the strands or ends of yarn may be simultaneously delivered to one or more feeders(s) 108 of the knitting machine 100 from multiple spools 111, as previously described.

FIG. 6F also illustrates the formation of a spacer knit constructions having two spacer strands 206*a*, 206*b* tucked behind alternating needles 101 of the first needle bed 102 and the second needle bed 104 to interlock with the yarns 202*a*, 202*b*, 202*c* with the yarns 204*a*, 204*b*. While FIG. 6F illustrates the formation of the spacer knit with two spacer strands 206*a*, 206*b*, it is envisioned that any number of spacer strands or ends could be used, including 1, 2, 3, 4, or more. As with the formation of the first surface and/or the second surface using different types of yarns or monofilaments, use of multiple different types of spacer strands may produce superior functional and/or aesthetic characteristics. For example, multiple different yarns having different hydrophilic and/or hydrophobic properties may be used to obtain desired moisture management properties.

Moreover, in any of the foregoing exemplary illustrations, the strands 202, 202*a*, 202*b*, 202*c*, 204, 204*a*, 204*b*, the spacer strand(s) 206, 206*a*, 206*b*, 207, and/or the inlaid strand(s) 208, may comprise different materials, textures, and/or colors. In this way, if one or more of the yarns 202, 202*a*, 202*b*, 202*c*, 204, 204*a*, 204*b*, the spacer strand(s) 206, 206*a*, 206*b*, 207, and/or the inlaid strand(s) 208 are comprised of a transparent or translucent material (including semi-transparent or fully-transparent), the various colors, patterns, textures, and/or knit structures within the spacer knit, including those internal to the spacer knit, may become visible, thereby creating a unique aesthetic appearance. As used herein semi-transparent and/or semi-translucent materials include those that allow an amount of light to pass through the material such that colors and/or structures behind the material remain at least partially visible.

Spacer Knit Materials

As previously noted, certain aspects of the present disclosure relate to articles at least partially formed from textiles, and in particular, an upper configured for use in an article of footwear. In the context of footwear, certain characteristics of the upper may be desirable, including for example, abrasion resistance, weight, user comfort, and aesthetics.

One material suited for construction of a knitted component for an upper for of an article of footwear, individually and/or in combination with other materials, is a monofilament comprised of a co-extruded nylon core having a thermoplastic polyurethane (TPU) sheath. An example of such monofilament is available from Nova Leather Enterprise Co. in Taiwan. As presently understood, such monofilament is only available in the color black, or alternatively at least semi-transparent or clear.

Figure 7:
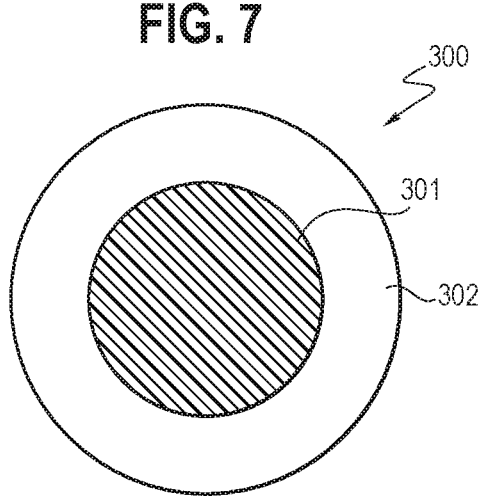

In one embodiment, the cross-sectional area of the co-extruded monofilament is comprised of a 60%/40% split between the nylon core and the TPU sheath. That is, as illustrated in FIG. 7, the nylon core 301 comprises 60% of the cross-sectional area of the monofilament 300, while the TPU sheath 302 comprises 40%. However, a suitable co-extruded monofilament could comprise a split between the nylon core and the TPU sheath ranging from 50%/50% to %70/30%. In other embodiments, the monofilament could comprise a high-tenacity polyester core (e.g. 5.0 grams per denier or greater) in place of the nylon core. In yet other embodiments, an alternative to the co-extruded monofilament may be another monofilament have a two-part composition, including, for example, a nylon core coated in thermoplastic material, or other coated yarn.

In one embodiment, the monofilament has a diameter of 0.13 mm and a linear mass density of 180 denier. However, in other embodiments, the monofilament could have a diameter ranging from 0.125-0.2 mm and/or a linear mass density between 150-210 denier. The co-extruded monofilament may also have an average elongation of about 67.5%, and an average tensile strength of about 0.5 kg. However, in other embodiments, the monofilament may have an average elongation between 50%-85%, and/or an average tensile strength between 0.3-0.7 kg. As used herein, elongation and tensile strength are used consistent with use of those terms in ASTM D2265. The TPU sheath of the monofilament may also have a glass transition temperature of around 130° C. and a melting temperature of around 175° C.

The co-extruded monofilament described above is uniquely suited for construction of a spacer knit in an upper for an article of footwear for various reasons. For example, the nylon core provides a strengthening component for the spacer knit construction, while the TPU sheath provides for abrasion resistance, moldability during any post-knitting heat processing, and translucency (before and/or after heat processing). In general, it has been observed that co-extruded monofilaments exhibit better strength properties than other similar yarns, such as coated yarns. It has further been observed that, when a knitted component having a spacer knit construction comprising such co-extruded monofilament is knitted and subsequently heat processed, the average Mullen Burst strength and abrasion resistance of the upper is increased, as compared to knitted components that do not undergo post-knitting heat processing. Exemplary post-knitting heat processing is shown and described in U.S. Non-provisional patent application Ser. No. 15/443,808, filed Feb. 27, 2017, and U.S. Provisional Patent Application No. 62/716,128, filed Aug. 8, 2018, the entireties of which are herein incorporated by reference.

Moreover, the relatively low glass transition temperature of the co-extruded monofilament disclosed above provides for exceptional molding capabilities during post-knitting heat processing when creating various 3-D structures, for example, in a knitted article of footwear (e.g., in a toe area, or a heel area), and in particular, one having a spacer knit construction. More specifically, the lower glass transition temperature permits molding of the knit component without the TPU material melting and flowing uncontrollably.

Finally, the smaller diameter and linear mass density of the co-extruded monofilament, when used in a spacer knit, enables and improves the transparency into and through the spacer knit, particularly when the TPU sheath of the monofilament is clear or transparent, either before and/or after post-knitting heat processing.

Another material suited for construction of a knitted component for an upper for of an article of footwear, individually and/or in combination with other materials, is a fine-denier nylon monofilament. One example of a suitable fine-denier nylon monofilament is available from Interfil SRL in Italy. As presently understood, such fine-denier nylon monofilament is available in a wide variety of colors.

In one embodiment, the nylon monofilament is comprised of nylon 6, has a diameter of 0.08 mm, and a linear mass density of approximately 61 denier. However, in other embodiments, the nylon monofilament could comprise other types of nylons, have a diameter ranging from 0.06-0.1 mm, and/or a linear mass density ranging from 50-70 denier. The nylon monofilament may also have an average elongation of about 30%, and an average tensile strength of about 0.4 kg. However, in other embodiments, the nylon monofilament may have an average elongation between 20-40%, and/or an average tensile strength between 0.3-0.5 kg.

The fine-denier nylon monofilament described above is uniquely suited for construction of a spacer knit in an upper for an article of footwear for various reasons. For example, the fine-denier nylon monofilament lends strength to the spacer knit construction, while at the same time, is very light weight. Moreover, the very fine diameter and small linear mass density, when used in a spacer knit, enables and improves the transparency into and through the spacer knit, particularly when the nylon monofilament is clear or transparent. On the other hand, use of one or more colored fine-denier nylon monofilaments can impart any number of colors, patterns, images, or logos to the spacer knit construction, whether internal or external. Moreover, a knitted component formed with the fine-denier nylon monofilament exhibits a superior "hand feel" as compared to knitted components formed with thicker monofilaments. That is, a knitted component with the fine-denier monofilament feels softer and smoother to the touch than a knitted component with thicker monofilaments. This characteristic is derived, at least in part, due to bending modulus of thicker monofilaments and the formation of more pointed and rigid knit loops, which result in a "scratchy" fabric.

Another material suited for construction of a knitted component for an upper for of an article of footwear, individually and/or in combination with other materials, is a high tenacity polyester yarn. One example of a suitable high tenacity polyester yarn is available from Unifi, Inc. in China.

In one embodiment, the high tenacity yarn is 100% polyester, has a linear mass density of 300 denier, includes 48 filaments per strand, and has a tenacity of 6.5 grams per denier. However, in other embodiments, the high tenacity yarn could include a polyester blend, have a linear mass density ranging between 250-350 denier, include more or less filaments per strand, and/or have a tenacity of at least 5 grams per denier.

High tenacity yarns of the type described above are uniquely suited for construction of a spacer knit in an upper for an article of footwear for various reasons. For example, the high tenacity yarn is capable of providing the loft and cushioning often associated with a spacer knit construction. Additionally, the high tenacity yarn provides lateral structural strength. In addition, high tenacity yarns of the type described above may also be characterized visually as having a sheen or luster that, when combined with other transparent or translucent materials, may create a unique aesthetic appearance.

Yet another material suited for construction of a knitted component for an upper for of an article of footwear, individually and/or in combination with other materials, is a smooth, soft textured polyester yarn. One example of a suitable polyester yarn is also available from Unifi, Inc. in China.

In one embodiment, the yarn is 100% polyester, has a linear mass density of 150 denier, and includes 100 filaments per strand. However, in other embodiments, the yarn could include a polyester blend, have a linear mass density ranging between 125-175 denier, and/or include more or less filaments per strand.

The smooth, soft textured polyester yarn described above is uniquely suited for construction of a spacer knit in an upper for an article of footwear for various reasons. For example, a knit component with this yarn provides a comfortable surface for interfacing with the foot of a user positioned within the article of footwear. In addition, the yarn is light weight and relatively low-cost. For example, at least in some embodiments, the polyester yarn may be made exclusively from recycled plastic materials, such as plastic bottles.

Yet another material suited for construction of a knitted component for an upper for an article of footwear, individually and/or in combination with other materials, is a so-called "fusible" or "low melt" yarn. One example of a suitable fusible yarn is available from EMS-Chemie AG of Switzerland, sold under the trade name Grilon KE60. Further disclosure relating to the use of such fusible yarn in a knitted component is set forth in U.S. Provisional Application No. 62/796,195, filed on Jan. 24, 2019, the entirety of which is herein incorporated by reference.

In one embodiment, the fusible yarn is comprised of a polyester substrate with poly block amide resin, has a linear mass density of about 150 denier, a tenacity of about 0.28 grams per denier, an elongation percentage of about 80%, a twist per meter (TPM) of around 300Z, and a melting temperature within the range of 55-65° C. However, in other embodiments, the fusible yarn may comprise other materials having a melting temperature below 140° C., and be capable of melting/post processing by steaming, heat, and/or pressing to bind or fuse with the surrounding (non-low melt) yarns or strands.

Fusible yarns are uniquely suited for construction of a spacer knit in an upper for an article of footwear for various reasons. For example, when subjected to a stimulus, such as steam, heat, and/or pressure, the thermoplastic polymer material included within the fusible yarn may at least partially melt then re-harden to enhance the rigidity, strength, abrasion resistance, and other mechanical properties of the knitted component, at least in select locations, and/or have the effect of securing or locking the relative positions of the other yarns or strands within the knitted component.

Exemplary Spacer Knits for an Upper of an Article of Footwear

Solely by way of example, and not by way of limitation, an upper of an article of footwear comprising a spacer knit construction formed of the materials described above is now described with reference to FIG. 6F. More specifically, an article of footwear may include one or more regions (e.g., in the toe areas of the foot, along the medial and lateral sides of the foot, around the heel area of the foot, and/or in a tongue region) comprising a spacer knit construction consistent with that shown and described with reference to FIG. 6F. In general, an outer surface of an upper for an article of footwear, and an outer surface of the spacer knit construction, may be formed of the yarns 202a, 202b, 202c on the needles 101 of the front needle bed 102 of the knitting machine 100, while an inner surface of the upper, and of the spacer knit construction, may be formed of the yarns 204a, 204b on the needles 101 of the rear needle bed 104.

In one embodiment, the co-extruded monofilament described above may be used for one of the strands or ends (e.g., 202a) that partially forms the outer surface of the spacer knit, while the fine-denier nylon monofilament may be used for two strands or ends (e.g., 202b, 202c) that partially form the outer surface of the spacer knit. In other words, the outer surface of the spacer knit construction in an article of footwear according to the present embodiment is formed of one strand of co-extruded monofilament having a nylon core and a TPU sheath, along with two strands of the fine-denier nylon monofilament.

Advantages of forming the outer surface of the spacer knit construction according to the present embodiment include abrasion resistance, strength, and transparency (whether before or after heat processing), while at the same time avoiding unwanted or excessive stiffness. As compared to an outer surface of a spacer knit construction formed solely of the co-extruded monofilament, the outer surface of the present embodiment is thinner and lighter weight. As compared to an outer surface of a spacer knit construction formed solely of the fine-denier nylon monofilament, the outer surface of the present embodiment exhibits superior strength and abrasion resistance. Notably, however, the outer surface of the present embodiment maintains transparency or translucency, so that the various colors, patterns, textures, and/or knit structures within the spacer knit, including those internal to the spacer knit, may become visible, thereby creating a unique aesthetic appearance.

In the same embodiment, the co-extruded monofilament described above may be used for one of the strands or ends (e.g., 204a) that partially forms the inner surface of the spacer knit, while the smooth, soft textured polyester yarn may be used for the second strand or end (e.g., 204b) that partially forms the inner surface of the spacer knit. In other words, the inner surface of the spacer knit construction in an article of footwear according to the present embodiment is formed of one strand of co-extruded monofilament having a nylon core and a TPU sheath, along with a single strand of the smooth, soft textured polyester yarn.

Advantages of forming the inner surface of the spacer knit construction according to the present embodiment include a balance between a smooth, soft surface for interfacing with a foot of a user, and a knitted component strong and stiff enough suitable for use in an interior of an article of footwear. As compared to an inner surface of a spacer knit construction formed solely of the co-extruded monofilament, the inner surface of the present embodiment is less stiff, less abrasive, and much softer. As compared to an inner surface of a spacer knit construction formed solely of the smooth, soft textured polyester yarn, the inner surface of the present embodiment provides stiffness, strength, and elasticity suitable for use in an interior of an article of footwear.

In the same embodiment, the high tenacity yarn described above may be used for the spacer strands 206a, 206b that interlock with the outer surface and the inner surface of the spacer knit. As previously noted, use of the high tenacity yarn provides the loft and cushioning often associated with a spacer knit construction. In addition, high tenacity yarns of the type described above may also be characterized visually as having a sheen or luster that, when combined in a spacer knit with other transparent or translucent materials, may create a unique aesthetic appearance.

In a further embodiment, an outer surface of the spacer knit is formed with individual courses that vary in construction and/or material composition. For example, while forming one or more consecutive courses (e.g., 2, 3, 4, or more), the outer surface may have a first construction and/or materials composition, wherein the co-extruded monofilament described above may be used for one of the strands or ends (e.g., 202a) that partially forms the outer surface of the spacer knit, while the fine denier nylon mono-filament may be used for two strands or ends (e.g., 202b, 202c) that partially forms the outer surface of the spacer knit. Over the same one or more consecutive courses, the inner surface may be formed as described above, that is, with one end of the co-extruded monofilament (e.g., 204a) and one end of the smooth, soft textured polyester yarn (e.g., 204b).

Then, while forming one or more subsequent consecutive courses (e.g., 2, 3, 4, or more), the outer surface may have a second construction and/or materials composition, wherein the co-extruded monofilament described above may be used for one or more strands or ends (e.g., 202a) that partially form the outer surface of the spacer knit, the fine denier nylon mono-filament may be used for one or more strands or ends (e.g., 202b) that partially form the outer surface of the spacer knit, while the fusible yarn described may be used for one or more strands or ends (e.g., 202c) that partially form the outer surface of the spacer knit. Over the same one or more subsequent consecutive courses, the inner surface may be formed as described above, that is, with one end of the co-extruded monofilament (e.g., 204a) and one end of the smooth, soft textured polyester yarn (e.g., 204b).

Advantages to varying the constructions and/or material compositions in the individual courses of the spacer knit using a fusible yarn within the outer surface include an increase in abrasion resistance, strength, and durability of the knitted component, following steam, heat, and/or pressure post-knit processing. Moreover, at least in select locations, use of a fusible yarn may have the effect of securing or locking the relative positions of the other yarns or strands within the knitted component, thereby further strengthening the knitted component.

It will be appreciated that the present disclosure is not limited to knitted components having a spacer knit construction, or knitted components having multiple layers. Rather, it is within the scope of the present disclosure to have or to form a knitted component having one or more layers, wherein at least one layer is comprised of one or more ends of a first monofilament (e.g., 202a), one or more ends of a second monofilament (e.g., 202b), and/or one or more ends of a fusible yarn (e.g., 202c), wherein the first monofilament has the properties described above with reference to the co-extruded monofilament, the second monofilament has the properties described above with reference to the fine-denier monofilament, and the fusible yarn has the properties described above.

Moreover, while the embodiments and other features are described generally herein with reference to an upper for an article of footwear, those features could additionally or alternatively be incorporated into another type of article. For example, the features described herein may be included in articles of apparel (e.g., shirts, pants, socks, footwear, jackets and other outerwear, briefs and other undergarments, hats and other headwear), containers (e.g., backpacks, bags), and upholstery for furniture (e.g., chairs, couches, car seats).

In the present disclosure, the ranges given either in absolute terms or in approximate terms are intended to encompass both, and any definitions used herein are intended to be clarifying and not limiting. Notwithstanding that the numerical ranges and parameters setting forth the broad scope of the present embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the present disclosure encompasses any and all possible combinations of some or all of the various aspects described herein. It should also be understood that various changes and modifications to the aspects described herein will be apparent to those skilled in the art. Such changes and modifications can be made without departing from the spirit and scope of the present disclosure and without diminishing its intended advantages. It is therefore intended that such changes and modifications be covered by the appended claims.

Exemplary Implementations

In one embodiment, a knitted component has a spacer knit construction, the spacer knit construction having a first knitted surface, a second knitted surface separate from the first surface, and a spacer strand extending between and interlocking with the first surface and the second surface. The first knitted surface comprises a first monofilament having a core surrounded by a sheath and a second fine-denier monofilament. The core may be comprised of nylon. The sheath may be comprised of a thermoplastic material. The thermoplastic material may be at least semi-transparent.

The cross-sectional area of the core may be between about 50%-70% of the cross-sectional area of the first monofilament. The cross-sectional area of the sheath may between about 30%-50% of the cross-sectional area of the first monofilament. The diameter of the first monofilament may between about 0.125-0.2 mm. The first monofilament may have a linear mass density between about 150-210 denier.

The second fine-denier monofilament is comprised of nylon. The diameter of the second fine-denier monofilament may be between about 0.06-0.10 mm. The second fine-denier monofilament may have a linear mass density between about 50-70 denier. The second fine-denier monofilament may have an average elongation between about 20-40%. The second fine-denier monofilament may have an average tensile strength between about 0.3 kg-0.5 kg. The second fine-denier monofilament may be at least semi-transparent. The spacer strand may be a yarn having a tenacity greater than 5.0 grams per denier.

The first knitted surface may include at least two strands of the first monofilament. The second knitted surface may include a separate monofilament having a core surrounded by a sheath. The second knitted surface may also include at least one polyester yarn.

In another embodiment, an upper for an article of footwear includes an outer knitted surface having a first set of loops comprising an extruded monofilament having a core surrounded by a sheath of thermoplastic material, a second knitted surface having a second set of loops, the second surface separate from the first surface, and at least one spacer strand interlocked with each of the first set of loops and the second set of loops.

The core may be comprised of nylon. The thermoplastic material may be at least semi-transparent. The cross-sectional area of the core may be between about 50%-70% of the cross-sectional area of the extruded monofilament. The cross-sectional area of the sheath may be between about 30%-50% of the cross-sectional area of the extruded monofilament. The diameter of the extruded monofilament may be between about 0.125 mm-0.2 mm. The extruded monofilament may a linear mass density between about 150-210 denier.

The first set of loops may further comprise a fine-denier monofilament. The fine-denier monofilament may be comprised of nylon. The diameter of the fine-denier monofilament may be between about 0.06-0.10 mm. The fine-denier monofilament may have a linear mass density between about 50-70 denier. The fine-denier monofilament may have an average elongation between about 20-40%. The fine-denier monofilament may have an average tensile strength between about 0.3-0.5 kg. The fine-denier monofilament may be at least semi-transparent.

The at least one spacer strand may include a yarn having a tenacity greater than 5.0 grams per denier. The first set of loops may comprise at least two strands of the first monofilament. The second set of loops may comprise a separate monofilament having a core surrounded by a sheath of thermoplastic material.

In another embodiment, a method of forming an upper for article of footwear includes forming a first set of loops on a first needle bed of a knitting machine, the first set of loops comprising a first monofilament having a core and a thermoplastic sheath, and a second fine-denier monofilament, forming a second set of loops on a second needle bed of the knitting machine, the second set of loops comprising a separate monofilament having a core and a thermoplastic sheath, and interlocking at least one spacer strand with each of the first set of loops and the second set of loops. The method further includes heating the first set of loops and the second set of loops at a temperature greater than a glass transition temperature of the thermoplastic sheath. The thermoplastic sheath may be at least semi-transparent. The second fine-denier monofilament may also be at least semi-transparent.

In another embodiment, a knitted component has an area formed with a spacer knit construction, the area including a first knitted layer, a second knitted layer facing opposite the first surface, the second knitted layer spaced relative to the first knitted and defining a cavity therebetween, and a spacer strand traversing the cavity between the first knitted layer and the second knitted layer to secure the first knitted layer to the second knitted layer. The first knitted layer may be at least partially formed with a first monofilament and a second monofilament such that both of the first monofilament and the second monofilament are exposed on an outer surface of the first knitted layer. The first monofilament may have a first denier, and the second monofilament may have a second denier, the first denier being at least 250% greater than the second denier.

The first monofilament may have a nylon core and a thermoplastic sheath. The first monofilament may be at least semi-transparent. The cross-sectional area of the core may be from about 50% to about 70% of the cross-sectional area of the first monofilament. The cross-sectional area of the sheath may be from about 30% to about 50% of the cross-sectional area of the first monofilament.

The diameter of the first monofilament may be from about 0.125 mm to about 0.2 mm. The first monofilament may have a linear mass density from about 150 denier to about 210 denier. The first monofilament may have an average elongation from about 50% to about 85%. The first monofilament may have an average tensile strength from about 0.3 kg to about 0.7 kg.

The second monofilament may be comprised of nylon. The diameter of the second monofilament may be from about 0.06 mm to about 0.10 mm. The second monofilament may have a linear mass density from about 50 denier to about 70 denier. The second monofilament may have an average elongation from about 20% to about 40%. The second monofilament may have an average tensile strength from about 0.3 kg to about 0.5 kg. The second monofilament may be at least semi-transparent.

The spacer strand may be the same as at least one of the first monofilament and the second monofilament. The spacer strand may include a third yarn that is different than the first monofilament and the second monofilament. The spacer strand may include a yarn having a tenacity greater than 5.0 grams per denier.

The first knitted layer may include a single end of the first monofilament. The first knitted layer may also include at least two ends of the second monofilament. The first knitted layer may further include at least one end of a fusible yarn. The second knitted layer may include at least one polyester yarn. The second knitted layer may also include at least one end of the first monofilament.

In yet another embodiment, a knitted component includes a first knitted layer including a first monofilament having a denier from about 150 to about 210, and a second monofilament having a denier from about 50 to about 70. A second knitted layer is at least partially overlapping and co-extensive with the first knitted layer, the second knitted layer including an end of the first monofilament and a third yarn, the third yarn being different than the first monofilament and the second monofilament.

The first monofilament may have a core-sheath construction. The core may be comprised of nylon. The sheath may be comprised of a thermoplastic material that is at least semi-transparent. The diameter of the first monofilament may be from about 0.125 mm to about 0.2 mm. The first monofilament may have an average elongation from about 50% to about 85%. The first monofilament may have an average tensile strength from about 0.3 kg to about 0.7 kg.

The second monofilament may be comprised of nylon. The diameter of the second monofilament may be from about 0.06 mm to about 0.10 mm. The second monofilament may have an average elongation from about 20% to about 40%. The second monofilament may have an average tensile strength between about 0.3 kg-0.5 kg. The second monofilament may be at least semi-transparent. The first knitted layer may include at least two ends of the second monofilament. The first knitted layer may further include at least one end of a fusible yarn. The second knitted layer may include at least one end of the first monofilament.

In another embodiment, a method of forming a knitted component includes forming a first set of loops on a first needle bed of a knitting machine, the first set of loops comprising a first monofilament having a core and a thermoplastic sheath, and a second monofilament having a linear mass density from about 50 denier to about 70 denier. The method further includes forming a second set of loops on a second needle bed of the knitting machine, the second set of loops comprising the first monofilament, and interlocking at least one spacer strand with each of the first set of loops and the second set of loops. The method also includes heating the first set of loops and the second set of loops at a temperature greater than a glass transition temperature of the thermoplastic sheath. The thermoplastic sheath may be at least semi-transparent. The second monofilament may be at least semi-transparent. The first set of loops may further include a fusible yarn.

In yet another embodiment, a knitted component includes a first knitted layer, and a second knitted layer that faces opposite the first knitted layer, wherein the first knitted layer is at least partially formed from one end of a first monofilament having a diameter from about 0.125 mm to about 0.2 mm, and at least two ends of a second monofilament having a diameter from about 0.06 mm to about 0.1 mm.

The first monofilament may comprise a nylon core and a thermoplastic sheath. The first monofilament may be at least semi-transparent. The cross-sectional area of the core may be from about 50% to about 70% of the cross-sectional area of the first monofilament. The cross-sectional area of the sheath may be from about 30% to about 50% of the cross-sectional area of the first monofilament. The first monofilament may have a linear mass density from about 150 to about 210 denier. The first monofilament may have an average elongation from about 50% to about 85%. The first monofilament may have an average tensile strength from about 0.3 kg to about 0.7 kg.

The second monofilament may be comprised of nylon. The second monofilament may have a linear mass density from about 50 denier to about 70 denier. The second monofilament may have an average elongation from about 20% to about 40%. The second monofilament may have an average tensile strength from about 0.3 kg to about 0.5 kg. The second monofilament may be at least semi-transparent. The first knitted layer may further include at least one end of a fusible yarn.

In another embodiment, a knitted component includes an outer surface comprising a first monofilament and a second monofilament, the first monofilament having a diameter from about 0.125 mm to about 0.2 mm, and a linear mass density in from about 150 denier to about 210 denier, and the second monofilament having a diameter from about 0.06 mm to about 0.1 mm, and a linear mass density from about 50 denier to about 70 denier. The first monofilament may be comprised of a nylon core and a thermoplastic sheath. The thermoplastic sheath may be at least semi-transparent. The second monofilament may be at least semi-transparent. The outer surface may further include a fusible yarn.

We claim:

1. A knitted component comprising an area formed with a spacer knit construction, the area comprising:
    a first knitted layer;
    a second knitted layer facing opposite from the first knitted layer, the second knitted layer spaced relative to the first knitted layer and defining a cavity therebetween; and
    a spacer strand traversing the cavity between the first knitted layer and the second knitted layer to secure the first knitted layer to the second knitted layer,
    wherein the spacer strand comprises a tenacity greater than 5 grams per denier,
    wherein the first knitted layer is at least partially formed with a first monofilament and a second monofilament such that both of the first monofilament and the second monofilament are exposed on an outer surface of the first knitted layer, and
    wherein the first monofilament comprises a first denier of 150 to 210 and the second monofilament comprises a second denier of 50 to 70.

2. The knitted component of claim 1, wherein the first monofilament comprises a nylon core and a thermoplastic sheath.

3. The knitted component of claim 2, wherein a cross-sectional area of the nylon core comprises 50% to 70% of a total cross-sectional area of the first monofilament.

4. The knitted component of claim 1, wherein the first monofilament comprises a diameter of 0.125 mm to 0.2 mm.

5. The knitted component of claim 1, wherein the second monofilament comprises a diameter of 0.06 mm to 0.10 mm.

6. The knitted component of claim 1, wherein the first knitted layer comprises at least two ends of the second monofilament.

7. The knitted component of claim 1, wherein the spacer strand comprises a third yarn that comprises a third denier greater than the first denier and the second denier.

8. An article of footwear comprising an upper at least partially formed from the knitted component of claim 1.

9. The knitted component of claim 1, wherein the spacer strand comprises a denier between 250 and 350.

10. A knitted component, comprising:
a first knitted layer at least partially formed from a first monofilament comprising a denier of 150 to 210 and a second monofilament comprising a denier of 50 to 70, wherein the first monofilament imparts the knitted component with at least partial transparency, wherein the first monofilament comprises a semi-transparent sheath surrounding a core, and wherein the semi-transparent sheath comprises a thermoplastic polyurethane;
a second knitted layer at least partially overlapping and co-extensive with the first knitted layer, the second knitted layer at least partially formed from a strand of the first monofilament and a third yarn, the third yarn comprising a denier different than the first monofilament and the second monofilament; and
a spacer strand traversing a cavity located between the first knitted layer and the second knitted layer to secure the first knitted layer to the second knitted layer, wherein the spacer strand has a tenacity of greater than 5 grams per denier.

11. The knitted component of claim 10, wherein the first monofilament comprises a diameter of 0.125 mm to 0.2 mm.

12. The knitted component of claim 10, wherein the second monofilament comprises a diameter of 0.06 mm to 0.10 mm.

13. The knitted component of claim 10, wherein the first knitted layer comprises at least two strands of the second monofilament.

14. The knitted component of claim 10, wherein the spacer strand comprises a fourth yarn that comprises a denier different than the first monofilament and the second monofilament.

15. An article of footwear comprising an upper at least partially formed from the knitted component of claim 10.

16. The knitted component of claim 10, wherein the core comprises nylon.

17. A knitted component, comprising:
a first knitted layer;
a second knitted layer that faces opposite from the first knitted layer; and
a spacer strand traversing a cavity located between the first knitted layer and the second knitted layer to secure the first knitted layer to the second knitted layer, wherein the spacer strand has a tenacity of greater than 5 grams per denier,
wherein the first knitted layer is at least partially formed from one strand of a first monofilament comprising a diameter of 0.125 mm to 0.2 mm, and from two strands of a second monofilament comprising a diameter of 0.06 mm to 0.1 mm, wherein each of the one strand of the first monofilament and the two strands of the second monofilament does not extend to an outer surface of the second knitted layer.

18. The knitted component of claim 17, wherein the first monofilament comprises a nylon core and a thermoplastic sheath.

19. The knitted component of claim 17, wherein the first monofilament comprises a denier of 150 to 210, and wherein the second monofilament comprises a denier of 50 to 70.

20. An article of footwear comprising an upper at least partially formed from the knitted component of claim 17.

* * * * *